US008211958B2

(12) United States Patent
Chu et al.

(10) Patent No.: US 8,211,958 B2
(45) Date of Patent: Jul. 3, 2012

(54) POLYOLEFIN NANOCOMPOSITES WITH FUNCTIONAL IONIC LIQUIDS AND CARBON NANOFILLERS

(75) Inventors: Benjamin Chu, Setauket, NY (US); Benjamin S. Hsiao, Setauket, NY (US); Hongyang Ma, Setauket, NY (US); Nobuyuki Taniguchi, Shiga (JP)

(73) Assignee: The Research Foundation of State University of New York, Albany, NY (US)

( * ) Notice: Subject to any disclaimer, the term of this patent is extended or adjusted under 35 U.S.C. 154(b) by 0 days.

(21) Appl. No.: 12/745,925

(22) PCT Filed: Dec. 5, 2008

(86) PCT No.: PCT/US2008/085619
§ 371 (c)(1),
(2), (4) Date: Jun. 24, 2010

(87) PCT Pub. No.: WO2009/108236
PCT Pub. Date: Sep. 3, 2009

(65) Prior Publication Data
US 2010/0286314 A1 Nov. 11, 2010

Related U.S. Application Data

(60) Provisional application No. 60/992,475, filed on Dec. 5, 2007.

(51) Int. Cl.
*C08G 73/10* (2006.01)
*C08K 3/04* (2006.01)
*C08K 9/00* (2006.01)

(52) U.S. Cl. ........ 523/215; 524/104; 524/495; 977/750; 977/752

(58) Field of Classification Search .................... 524/99, 524/105, 187, 87, 104, 404, 495, 586; 523/215; 264/210; 428/36, 9; 548/343.1; 525/200; 977/750, 752
See application file for complete search history.

(56) References Cited

U.S. PATENT DOCUMENTS

| 7,652,084 B2 * | 1/2010 | Chu et al. ................ 524/236 |
| 2005/0272856 A1 * | 12/2005 | Cooper et al. ............. 524/496 |
| 2007/0161734 A1 * | 7/2007 | Fudemoto et al. .......... 524/445 |
| 2007/0255002 A1 | 11/2007 | Alba |
| 2007/0265379 A1 * | 11/2007 | Chen et al. ................ 524/404 |
| 2008/0210907 A1 * | 9/2008 | Yoshida et al. .......... 252/301.36 |

FOREIGN PATENT DOCUMENTS
WO 2005084167 9/2005

OTHER PUBLICATIONS

Dalton, et al., "Super-tough carbon-nanotube fibres", Nature, vol. 423, p. 703 (2003).
Ran, et al., "In situ synchrotron SAXS/WAXD studies during melt spinning of modified carbon nanofiber and isotactic polypropylene nanocomposite", Colloid Polym Sci, vol. 282, pp. 802-809 (2004).

* cited by examiner

*Primary Examiner* — Vasu Jagannathan
*Assistant Examiner* — Hannah Pak
(74) *Attorney, Agent, or Firm* — Carter, Deluca, Farrell & Schmidt, LLP

(57) ABSTRACT

The present disclosure provides polyolefin blends and nanocomposites and methods for their production. In embodiments, a blend or nanocomposite of the present disclosure may include at least one polyolefin and at least one ionic liquid and/or one modified carbon nanofiller. In embodiments, the at least one modified carbon nanotube may be treated with at least one ionic compound.

21 Claims, 11 Drawing Sheets

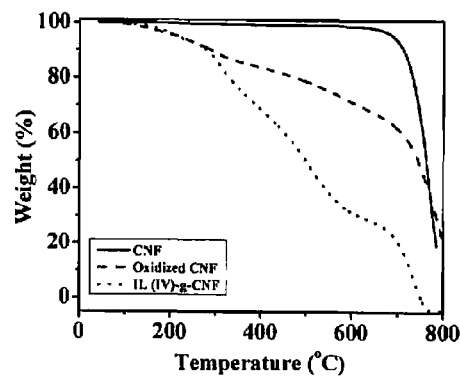
Fig. 8
Fig. 9
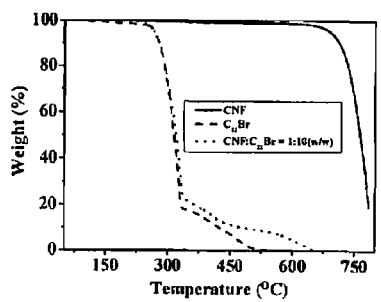 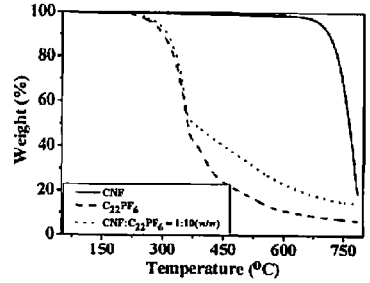
Fig. 10A  Fig. 10B

POLYOLEFIN NANOCOMPOSITES WITH FUNCTIONAL IONIC LIQUIDS AND CARBON NANOFILLERS

CROSS-REFERENCE TO RELATED APPLICATION

This application claims the benefit of and priority to PCT Application No. PCT/US2008/085619 filed on Dec. 5, 2008 which, in turn, claims the benefit of and priority to U.S. Provisional Patent Application Ser. No. 60/992,475 filed Dec. 5, 2007, the entire disclosures of each of which are hereby incorporated by reference herein.

GOVERNMENT RIGHTS

This invention was made with Government support under National Science Foundation Grant DMR 0454887. The Government has certain rights in the invention.

BACKGROUND

Methods and techniques for enhancing the physical and/or mechanical properties of polyolefins are known. For example, the development of high performance ultra-high molecular weight polyethylene (UHMWPE) films and fibers has been well established, which can be achieved by using a range of unique processing techniques to avoid the generation of high entanglement density in the final products. Such techniques include film drawing and fiber spinning in the gel state. However, one drawback to some of these methods is they require a large amount of solvent. If processed by conventional melt-processing techniques with the aid of solvent, UHMWPE chains usually produce an extraordinarily high entanglement density, resulting in very low drawability or brittleness in the final product.

Carbon nanotubes, including single-wall nanotube (SWNT), multi-wall nanotube (MWNT) and carbon nanofibers (CNFs), have recently received a great deal of attention in the polymer community. Efforts have been undertaken to develop super-tough composite materials based on carbon nanotubes and polymer matrices. For example, one study has demonstrated the super-tough performance of polyvinyl alcohol (PVA)/single wall carbon nanotube (SWNT) nanocomposite fibers. Dalton et al., "Super-tough Carbon-Nanotube Fibres" *Nature* (2003), Vol. 423, p. 703.

These nanostructured materials have been recognized for their superior mechanical strength, excellent thermal conductivity and electrical conductivity, and thus may be utilized to improve the properties of various polymers.

Carbon nanofibers are potentially useful in reinforced composites, as supports for catalysts in high temperature reactions, heat management, reinforcement of elastomers, filters for liquids and gases, and as a component of protective clothing. Nanofibers of carbon or polymers are likely to find applications in reinforced composites, substrates for enzymes and catalysts, applying pesticides to plants, textiles with improved comfort and protection, advanced filters for aerosols or particles with nanometer scale dimensions, aerospace thermal management applications, and sensors with fast response times to changes in temperature and chemical environment.

In the case of mechanical enhancement, all published work on polymeric nanocomposites containing carbon nanotubes indicate that the improvement is only incremental; substantially below the expectation of the super-tough performance of polyvinyl alcohol (PVA)/SWNT nanocomposite fibers demonstrated by Dalton et al. described above.

Nanofibers having enhanced mechanical and electrical characteristics, including enhanced strength and fire retardant capabilities, thus remain desirable, as are composites including such nanofibers.

SUMMARY

In accordance with the present disclosure, a new class of polyolefin blends and nanocomposites containing functional ionic liquids and/or surface-modified carbon nanofillers (e.g. single-walled carbon nanotubes, multi-walled carbon nanotubes, carbon nanofibers, graphene sheets, graphite nanoparticles) with ionic liquids is provided. The hydrophobic tail (e.g. long alkyl substituted group) of the ionic liquid can be made compatible with a polyolefin (e.g. polyethylene, polypropylene, their random and block copolymers), and the cationic head of the ionic liquid can form strong and stable $\pi$-$\pi$ interactions with the graphene plane of carbon nanofillers, as well as some aromatic dyes and antimicrobial agents. As a result, charged ionic liquids can be used: as a plasticizer (viscosity adjustable agents) to polyolefins; as a compatibilizer to multi-component polyolefin blends; and as functionalizable agents that can form stable complex with color dyes, molecular fingerprint agents (e.g. fluorescent agents) and antimicrobial agents.

The carbon nanofillers (e.g. single-walled carbon nanotubes, multi-walled carbon nanotubes, carbon nanofiber, graphene sheets, and graphite nanoparticles) can be used as nanoscale vehicles to carry functional ionic liquids through surface interactions and they also can serve as reinforcing agents.

According to embodiments of the present disclosure, a polymer blend is provided. The polymer blend may include at least one polyolefin and at least one modified carbon nanofiller, wherein the at least one modified carbon nanofiller has been treated with at least one ionic compound.

A method of producing a polymer blend is also contemplated by the present disclosure. The method may include obtaining at least one carbon nanofiller, treating the at least one carbon nanofiller with at least one ionic compound to produce a modified carbon nanofiller, and blending the modified carbon nanofiller with a polyolefin to produce the polymer blend.

According to another aspect of the present disclosure a polymer blend is provided. The polymer blend may include at least one polyolefin and at least one ionic liquid.

BRIEF DESCRIPTION OF THE FIGURES

The above and other aspects, features and advantages of the present disclosure will become more apparent in light of the following detailed description when taken in conjunction with the accompanying drawings in which:

FIG. 8 is a graph of CNF, oxidized CNF and ionic liquid IV grafted CNF;

FIG. 9 is an illustration of a method of chemical grafting a CNF with an ionic liquid;

FIG. 10 is a graph illustrating chemical stability of ionic liquid modified carbon nanofiller ("iCNF") in decalin;

DETAILED DESCRIPTION

Figures 1A, 1B, 1C:
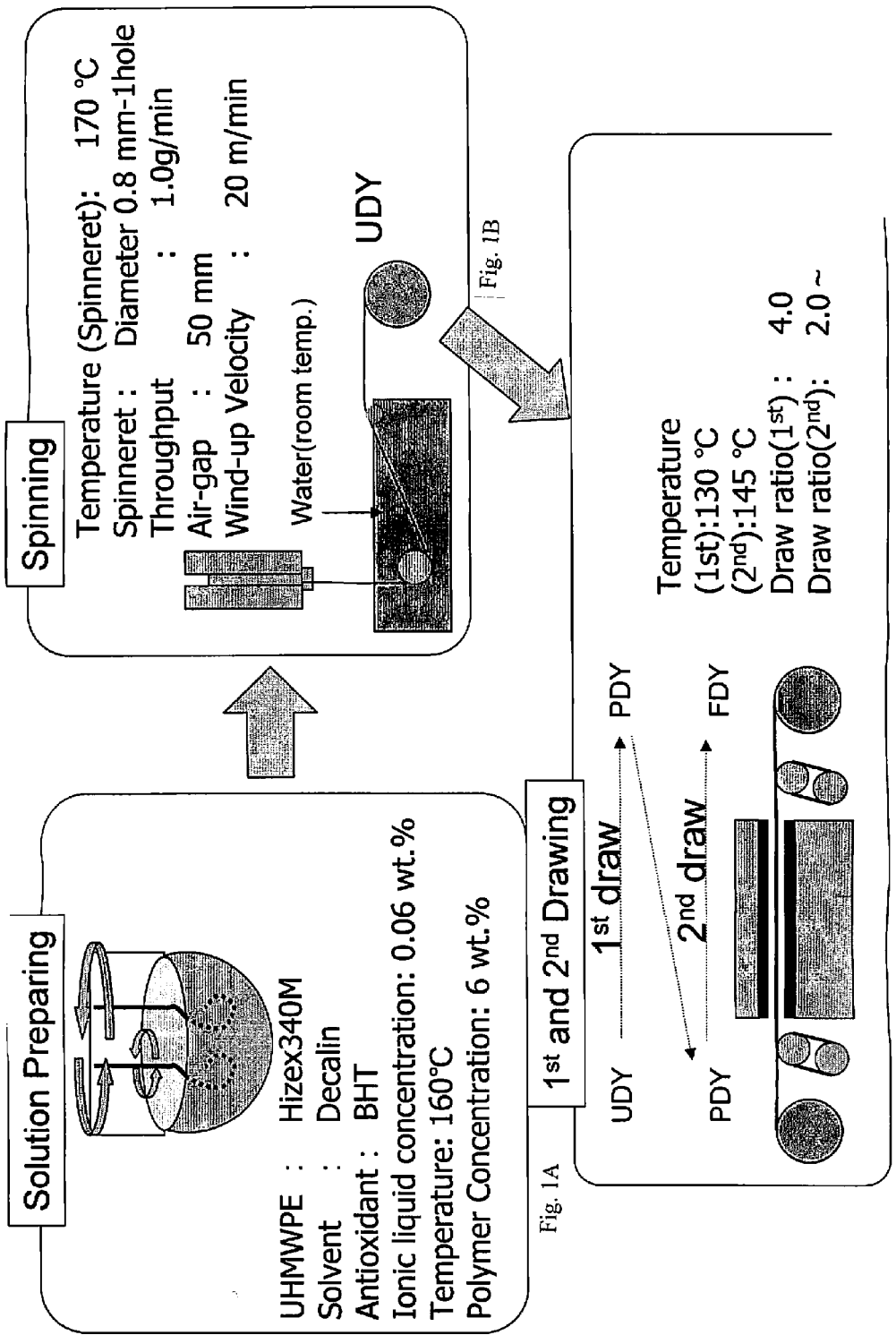
FIGS. 1A-C are schematic diagrams of a system for preparation of a gel-spun fiber based on ultra-high molecular weight polyethylene ("UHMWPE") and ionic liquid.

In accordance with the present disclosure, a class of polyolefin blends and nanocomposites including functional ionic liquids and/or surface-modified carbon nanofillers (e.g. single-walled carbon nanotubes, multi-walled carbon nanotubes, carbon nanofibers, graphene sheets, graphite nanoparticles) with ionic compounds is disclosed. In embodiments, the ionic compounds may be ionic liquids at standard temperature and pressure, e.g., from about 0° C. to about 100° C. and from about 90 kPa to about 110 kPa.

Any polyolefin may be utilized in accordance with the present disclosure. Examples of polyolefins include, but are not limited to, polyethylenes, polypropylenes, ethylene-propylene copolymers, high pressure low density polyethylenes, linear low density polyethylenes, linear medium density polyethylenes, high density polyethylenes, and modified polyethylenes, their random and block copolymers, combinations thereof, and the like. In some embodiments, ultra high molecular weight polyolefins, including ultra high molecular weight polyethylene (UHMPE) may be utilized.

Any suitable ionic liquid may be utilized. For example, 1-docosanyl-3-methylimidazolium bromide ionic liquid (sometimes referred to herein as ionic liquid I) and 1-docosanyl-3-methylimidazolium hexafluorophosphate ionic liquid (sometimes referred to herein as ionic liquid II), 1-hydroxyethyl-3-docosanylimidazolium bromide (sometimes referred to herein as ionic liquid III) and 1-aminoethyl-3-docosanylimidazolium bromide (sometimes referred to herein as ionic liquid IV), the synthesis of each of which is set forth in greater detail below in the Examples. Suitable ionic liquids that may be used to modify CNFs are listed below in Table 1, in which Br: bromide; $BF_4$: tetrafluoroborate; $PF_6$: hexafluorophosphate; $Tf_2N$: bis(perfluoroethylsulfonyl)imide.

TABLE 1

| Ionic liquids | Cation | Anion (A) | Length of substituted group (n) |
|---|---|---|---|
| 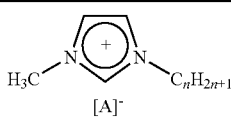 | imidazolium | Br<br>$BF_4$<br>$PF_6$<br>$Tf_2N$ | 14; 16; 18; 20; 22 |
| 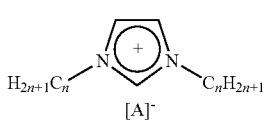 | imidazolium | Br<br>$BF_4$<br>$PF_6$<br>$Tf_2N$ | 14; 16; 18; 20; 22 |
|  | pyridinium | Br<br>$BF_4$<br>$PF_6$<br>$Tf_2N$ | 14; 16; 18; 20; 22 |
| 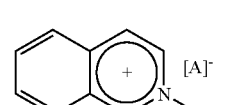 | isoquinolium | Br<br>$BF_4$<br>$PF_6$<br>$Tf_2N$ | 14; 16; 18; 20; 22 |
| 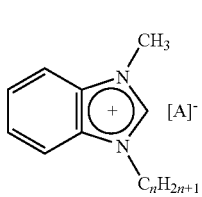 | benzoimidazolium | Br<br>$BF_4$<br>$PF_6$<br>$Tf_2N$ | 14; 16; 18; 20; 22 |

TABLE 1-continued

| Ionic liquids | Cation | Anion (A) | Length of substituted group (n) |
|---|---|---|---|
| benzoimidazolium cation with two $C_nH_{2n+1}$ groups on N atoms, [A]⁻ | benzoimidazolium | Br<br>BF$_4$<br>PF$_6$<br>Tf$_2$N | 14; 16; 18; 20; 22 |

The functions of ionic liquids can be as viscosity adjustable agents (plasticizers), and as a compatibilizer to multi-component blends, including color dyes, molecular fingerprint agents (e.g. fluorescent agents), and antimicrobial agents. The non-ionic part (e.g. long alkyl substituted group) of the ionic liquid can be made compatible with a polyolefin (e.g. polyethylene, polypropylene, their random and block copolymers).

Any suitable carbon nanofiller may be utilized. Suitable carbon nanofillers include single-walled carbon nanotubes, multi-walled carbon nanotubes, carbon nanofibers, graphene sheets, and graphite nanoparticles. Additional examples of suitable polyolefins and carbon nanofillers, as well as combinations thereof, which may be utilized herein include the materials disclosed in commonly owned International Application No. PCT/US2004/028767, published as WO 2005084167, filed Sep. 3, 2004, entitled "Nanocomposite containing polyolefin and surface-modified carbon nanotube fibers with super-tough performance" which claims priority to U.S. Provisional Patent Application No. 60/500,812, filed Sep. 5, 2003, the entire disclosures of each of which are incorporated by reference herein.

Ionic liquids may be combined with the carbon nanofillers (CNFs). The ionic part of the ionic liquid can form strong and stable π-π interactions with the graphene plane of carbon nanofillers, as well as some aromatic dyes and antimicrobial agents.

The surface modified CNF (e.g. single-walled carbon nanotubes, multi-walled carbon nanotubes, carbon nanofibers, graphene sheets, graphite nanoparticles) may be prepared as described in the Examples below and similar methods within the purview of those skilled in the art which include conjugation with ionic liquids containing hydrophobic tails (e.g. long alkyl-substituted group). This class of carbon nanofillers can be made compatible with a polyolefin (e.g. polyethylene, polypropylene, and their random and block copolymers) as further described in the Examples below and similar methods within the purview of those skilled in the art.

The carbon nanofillers ("CNF") (e.g. single-walled carbon nanotubes, multi-walled carbon nanotubes, carbon nanofibers, graphene sheets, and graphite nanoparticles) may also be used as nanoscale vehicles to carry functional ionic liquids through surface interactions and they also can serve as reinforcing agents.

In one embodiment, a cationic ionic liquid having long alkyl substituted group and its stable complex with carbon nanofiber (CNF) may be used to improve the processability, mechanical property (i.e., elongation and toughness) and functionalizability of UHMWPE. The UHMWPE material is well known to be difficult to melt process, highly inert (not easy to color) and have low elongation to break ratio due to larger chain entanglements. The cationic part of the ionic liquid can form strong π-π interactions with the para-arene surface of carbon nanofibers. As a result, the surface modified carbon nanofibers (with an ionic liquid) can be easily dispersed in the UHMWPE matrix, and the unique property of ionic liquid modified CNF can significantly improve the toughness of UHMWPE as well as the anchoring of molecular dyes in the polymer matrix. It is apparent that polyolefin nanocomposites containing surface modified carbon nanofillers can be used to create of a new class of functional fibers and films.

The nanocomposite of the present disclosure may contain from about 0.01 wt % to about 30 wt % modified CNF, in embodiments from about 0.05 wt % to about 15 wt % modified CNF, in other embodiments from about 0.1 wt % to about 5 wt % modified CNF. Thus, the nanocomposite of the present disclosure may contain from about 99.99 wt % to about 70 wt % polyolefin, in embodiments from about 99.95 wt % to about 85 wt % polyolefin, in other embodiments from about 99.9 wt % to about 95 wt % polyolefin.

The resulting nanocomposite may then be used to form fibers or films using commercially available equipment and techniques. They can be either melt-spun or gel-spun into fibrous form, or melt-cast or gel-cast into film form, with or without uni-axial/bi-axial stretching for alignment of the modified carbon nanofibers. This minimizes stress to the modified carbon nanofibers and results in improved mechanical and electrical properties as well as improved fire retardant properties.

In embodiments, nanocomposites of the present disclosure may be spun into fibers pursuant to the process set forth in Ran et al., "In-Situ Synchrotron SAXS/WAXD of Melt Spinning of Modified Carbon Nanofiber and Polypropylene Nanocomposite", from ACS PMSE, 89, 735-736 (2003), the contents of which are incorporated by reference herein.

In another embodiment, the nanocomposites of the present disclosure may be formed into films utilizing techniques within the purview of those skilled in the art. Suitable methods for forming films include, but are not limited to, extrusion, melt-press, blowing, injection molding, and/or thermal molding.

In embodiments, the film may be formed utilizing a melt-press method by heating the modified CNF/UHMWPE nanocomposite to a temperature of from about 100° C. to about 210° C., in embodiments from about 140° C. to about 200° C., in other embodiments to a temperature of from about 170° C. to about 190° C., and placing the film into a press at a pressure of from about 0.5 MPa to about 10 MPa, in embodiments from about 1.0 MPa to about 5.0 MPa, in other embodiments from about 1.5 MPa to about 2.5 MPa. The nanocomposite can be held in the press under this pressure for a period of time of from about 1 minute to about 30 minutes, in embodiments from about 3 minutes to about 10 minutes, in other embodiments from about 4 minutes to about 6 minutes. The resulting film can have a thickness of from about 0.05 mm to about 2.5 mm, in embodiments from about 0.1 mm to about 1.0 mm, in other embodiments from about 0.15 mm to about 0.5 mm.

The following Examples are being submitted to illustrate embodiments of the present disclosure. These Examples are intended to be illustrative only and are not intended to limit the scope of the present disclosure. Also, parts and percentages are by weight unless otherwise indicated.

EXAMPLES

The UHMWPE powders utilized in the Examples had a molecular weight of about 6,000,000 g/mol and were obtained from Basell, USA. The carbon nanofiber (CNF, PR-24-HHT obtained from Pyrograf Products, Inc.) had undergone thermal treatments to remove any non-carbon material. The typical morphology of the as-received CNFs exhibited an average diameter of 70 nm and a length of 50-100 μm. It was found that the as-received CNF samples were clean, so no additional purification procedures were taken.

1-Methylimidazole, 1-bromodocosane, 1-docosanylimidazole, 2-bromoethanol, 2-bromoethylamine hydrobromide, hexafluorophosphoric acid (60% water solution) and all other reagents were purchased from Aldrich and used as received.

Thermal gravimetric analysis (TGA) scans of the samples were collected at 10° C./min from 60° C. to 800° C. under an air flow. The $^1$H NMR (nuclear magnetic resonance) spectrum was taken at 25° C. with CDCl$_3$ and DMSO-d$_6$ as the solvent. All melt-pressed film samples were uniaxially stretched at room temperature using a modified tensile apparatus, where symmetric deformation was carried out. The initial length between the jaws of the tensile apparatus may be 10 mm and the chosen stretching rate may be about 5 mm/min. Small amplitude oscillatory shear (SAOS) measurements were performed using a stress-controlled rheometer equipped with parallel plate geometry (diameter 25 mm). The measurements were carried out at 180° C. Frequency sweeps were performed in the frequency window of 0.005 <ω<100 rad/s. The shear strain amplitude was γ=0.5%, in the linear viscoelastic region. Dry nitrogen was maintained to suppress oxidative degradation at high temperatures. In-situ wide-angle X-ray diffraction (WAXD) and small-angle X-ray scattering (SAXS) experiments were also carried out. The wavelength used was 0.1371 nm. The sample-to-detector distance for WAXD was 119.0 mm, and that for SAXS was 1769.0 mm. A two-dimensional MAR-CCD X-ray detector was used for the real-time data collection during sample stretching. A typical image acquisition time was 20 s per image.

Example 1

Synthesis of 1-docosanyl-3-methylimidazolium bromide ionic liquid (sometimes referred to herein as ionic liquid I). The synthetic route is shown below:

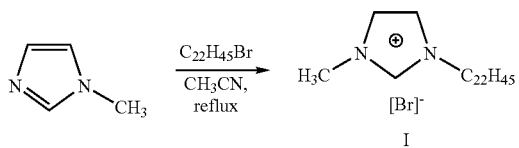

About 2 g (0.025 mol) of 1-methylimidazole and 10.7 g (0.026 mol) of 1-bromodocosane were dissolved into 20 mL of acetonitrile. The mixture was refluxed at 85° C. for 24 hours, and subsequently cooled down to room temperature. The resulting samples (cake like) were filtered and washed with ethyl ether three times. The final product: 1-docosanyl-3-methylimidazolium bromide was obtained as a white powder after being dried in a vacuum oven. The yield of this procedure was 81.4% with a melting point (Mp): 82.9° C. The spectra of $^1$H NMR (CDCl$_3$ as the solvent, δ, ppm) were: 10.713 (N—CH—N, s, 1H), 7.274 (N—CH—CH, s, 1H), 7.218 (N—CH—CH, s, 1H), 4.310 (N—CH$_2$, t, 2H), 4.130 (N—CH$_3$, s, 3H), 1.918 (N—CH$_2$—CH$_2$, m, 2H), 1.248 (N—CH$_2$—CH$_2$—(CH$_2$)$_{19}$, m, 38H), 0.874 (CH$_3$, t, 3H).

Example 2

Synthesis of 1-docosanyl-3-methylimidazolium hexafluorophosphate ionic liquid (sometimes referred to herein as ionic liquid II). The synthetic route is shown below:

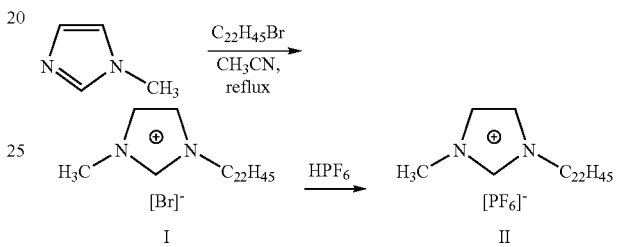

About 4 g (0.008 mol) of 1-docosanyl-3-methylimidazolium bromides was dispersed into 150 mL of water, and then, 2.0 mL (0.014 mol) of hexafluorophosphoric acid aqueous solution was dropped slowly into the suspension under continuous stirring. The mixture was stirred for 24 h at room temperature. CH$_2$Cl$_2$ was subsequently added to form a two-layer mixture, allowing the removal of the water layer. After evaporation of CH$_2$Cl$_2$, the white solid was washed with water until neutral. The powdery product was dried in a vacuum oven. The yield of this procedure was 95% with a melting point of 89.8° C. The spectra of $^1$H NMR (CDCl$_3$ as the solvent, δ, ppm) was 8.541 (N—CH—N, s, 1H), 7.264 (N—CH—CH, s, 1H), 7.228 (N—CH—CH, s, 1H), 4.135 (N—CH$_2$, t, 2H), 3.920 (N—CH$_3$, s, 3H), 1.860 (N—CH$_2$—CH$_2$, m, 2H), 1.248 (N—CH$_2$—CH$_2$—(CH$_2$)$_{19}$, m, 38H), 0.875 (CH$_3$, t, 3H).

Example 3

The preparation of UHMWPE/ionic liquid binary blends. An ionic liquid and decalin solution was heated at 70° C. for approximately 5 minutes to homogenize the solution. A desired amount of UHMWPE was subsequently added to this solution and the resulting mixture was heated to about 140° C. at a rate of about 0.2° C./min under stirring and kept at approximately 140° C. for about 1 hour. The solution was then cooled down to room temperature and the polymer blend was separated by filtration and dried in a vacuum oven at about 60° C. to remove most part of decalin. The sample was then melt mixed with 0.5 wt % (based on the amount of UHMWPE) of antioxidant using a twin-screw blender (DACA instruments) at approximately 170° C. for about 5 min. The recovered sample was dried in a vacuum oven at about 80° C. to constant weight as determined by TGA until loss weight was less than 0.5% within the temperature range of 0-200° C. The final samples were melt pressed at about 180° C. into flat films having a thickness of about 0.3 mm. The compositions of the prepared binary mixtures of UHMWPE/IL are shown in Table 2.

TABLE 2

| Binary Mixtures | Composition (weight ratio) |
| --- | --- |
| N5 | UHMWPE:$C_{22}$Br (Example 1) = 100:0.2 |
| N6 | UHMWPE:$C_{22}$Br (Example 1) = 100:2.0 |
| N7 | UHMWPE:$C_{22}$PF$_6$ (Example 2) = 100:0.2 |
| N8 | UHMWPE:$C_{22}$PF$_6$ (Example 2) = 100:2.0 |

Example 4

Figure 2:
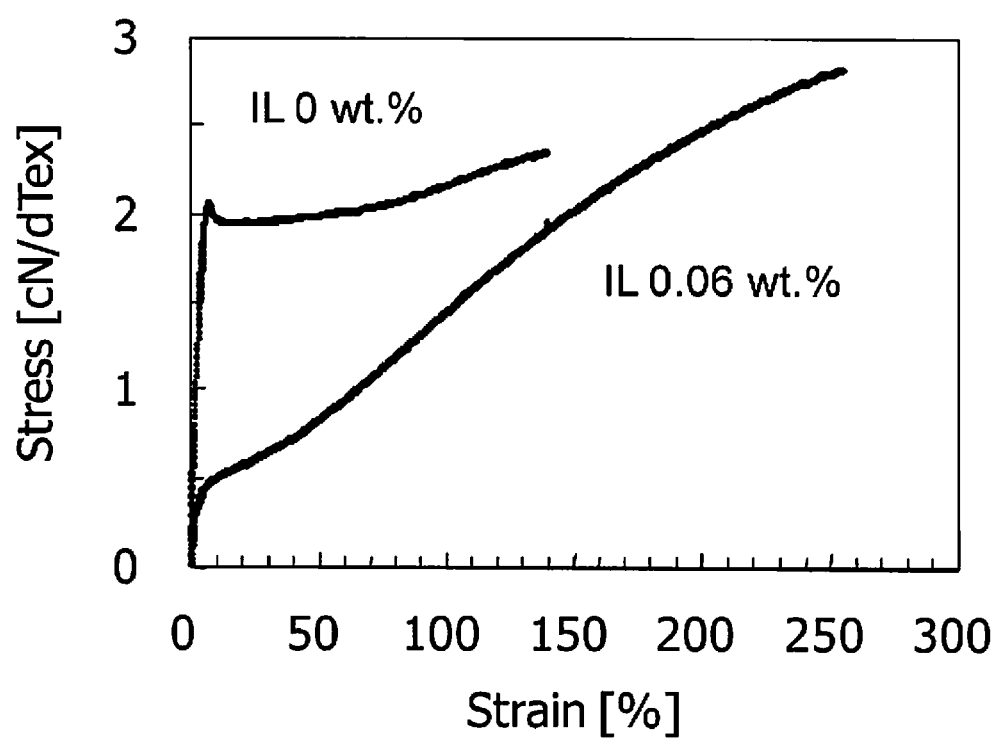
FIG. 2 is a graph of tensile property of a gel-spun fiber based on UHMWPE/ionic liquid blend.

The preparation of gel-spun fiber based on UHMWPE/ionic liquid binary blends and its characterizations. A binary mixture of UHMWPE (Hizex340M) and ionic liquid (sample in Example 1, $C_{22}$Br) was prepared. A schematic diagram of the sample preparation based on the procedure in Example 3 is shown in FIGS. 1A-C. FIG. 1A illustrates preparation of a solution of decalin, BHT as an antioxidant, the ionic liquid and the polymer. The ionic liquid concentration was 0.06 wt %, the polymer concentration was 6 wt % and the mixing temperature was about 160° C. A schematic diagram of fiber gel spinning of this binary blend is also illustrated in FIG. 1B. The spinning occurred at a temperature (spinneret) of about 170° C. using a spinneret having one hole with a of diameter about 0.8 mm, throughput of 1.0 g/min, air-gap of 50 mm and wind-up velocity of 20 m/min. The post-draw conditions for the fiber treatments (2 draw sequences was applied) are also illustrated in FIG. 1C. In these treatments, the 1$^{st}$ draw temperature was about 130° C.; the 2nd draw temperature was about 145° C. The 1st draw ratio was about 4.0 and the 2$^{nd}$ draw ratio was about 2.0. As shown in FIG. 1C, the undrawn yarn ("UDY") is drawn through the first draw to obtain a partially drawn yarn ("PDY"), which is then drawn through the second draw to obtain a finished drawn yarn ("FDY"). The comparison of fiber properties between gel-spun fibers of pure UHMWPE and UHMWPE/ionic liquid binary blend (all spun at the same conditions) are shown in Table 3 below (PE=the polyethylene; IL=the ionic liquid; η=the viscosity). FIG. 2 also illustrates tensile properties of a gel-spun fiber based on UHMWPE/ionic liquid blend.

TABLE 3

| Weight ratio | | [η] | Titer | Tenacity | Elongation | Modulus |
| --- | --- | --- | --- | --- | --- | --- |
| PE | IL | [dL/g] | [dtex] | [cN/dtex] | [%] | [cN/dtex] |
| Sample 1 | 6 | 0 | 17.1 | 43.4 | 2.4 | 140 | 83 |
| Sample 2 | 6 | 0.06 | 16.6 | 39.9 | 2.8 | 255 | 27 |

Figure 3A:
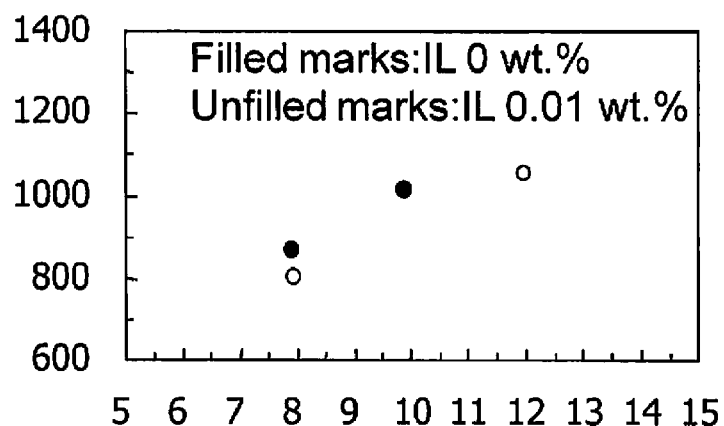
FIGS. 3A-C are graphs of tensile properties (modulus, elongation and tenacity) of finished drawn fiber ("FDY") as a function of draw ratio.
Figure 3B:
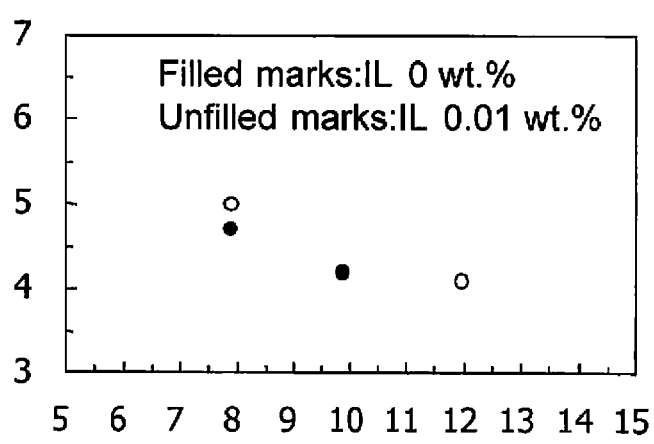
Figure 3C:
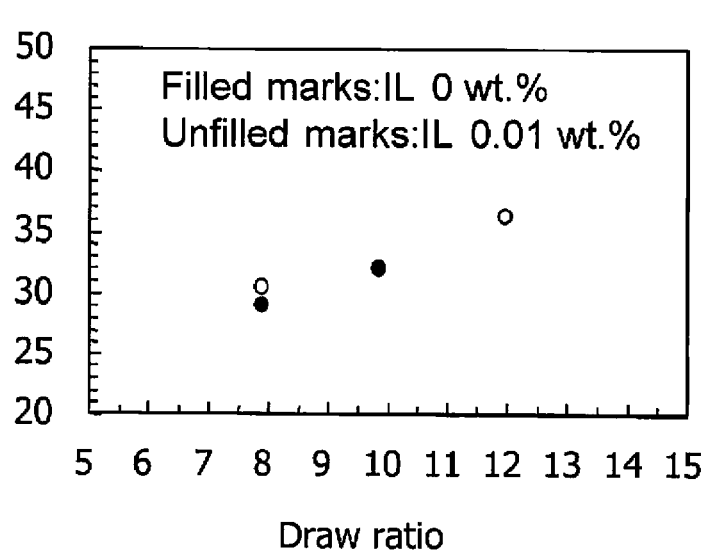

The tensile properties (modulus, elongation and tenacity) of finished drawn fiber (FDY) as a function of draw ratio are shown in FIGS. 3A-C. The binary mixture of UHMWPE/Ionic liquid gel spun fiber shows higher drawability, which results in higher tensile strength.

Example 5

Figure 4:
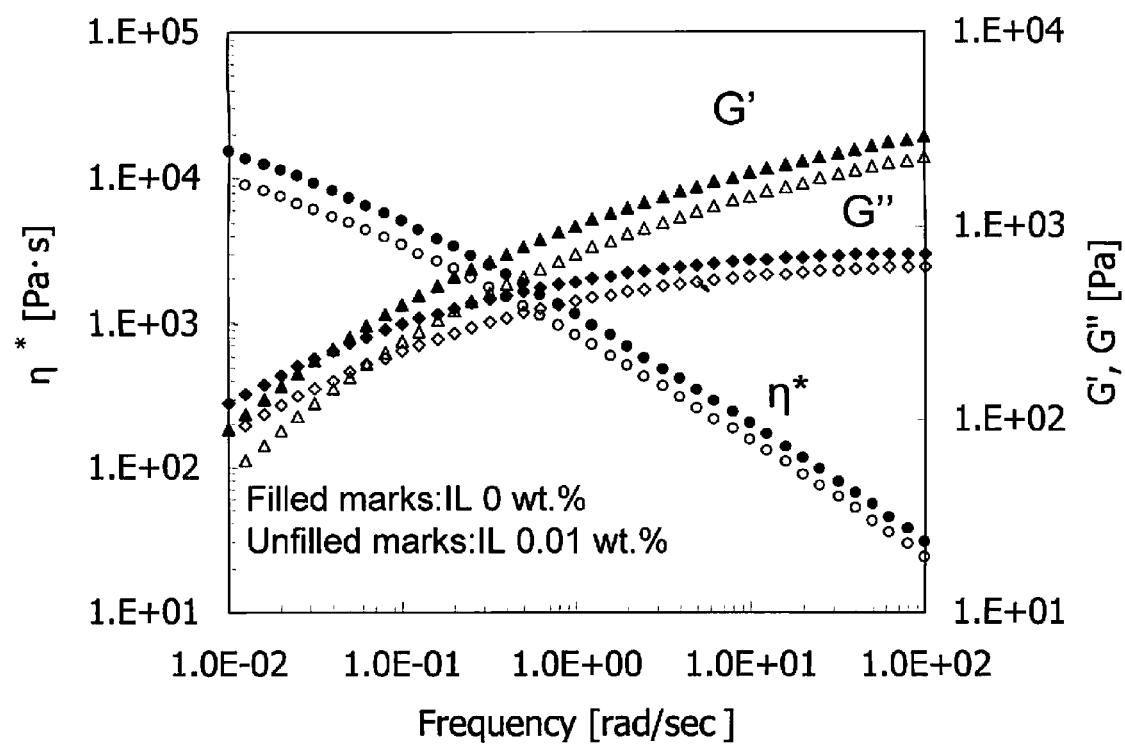
FIG. 4 is a graph of linear shear viscoelasticity of UHMWPE/solvent mixtures.
Figure 5:
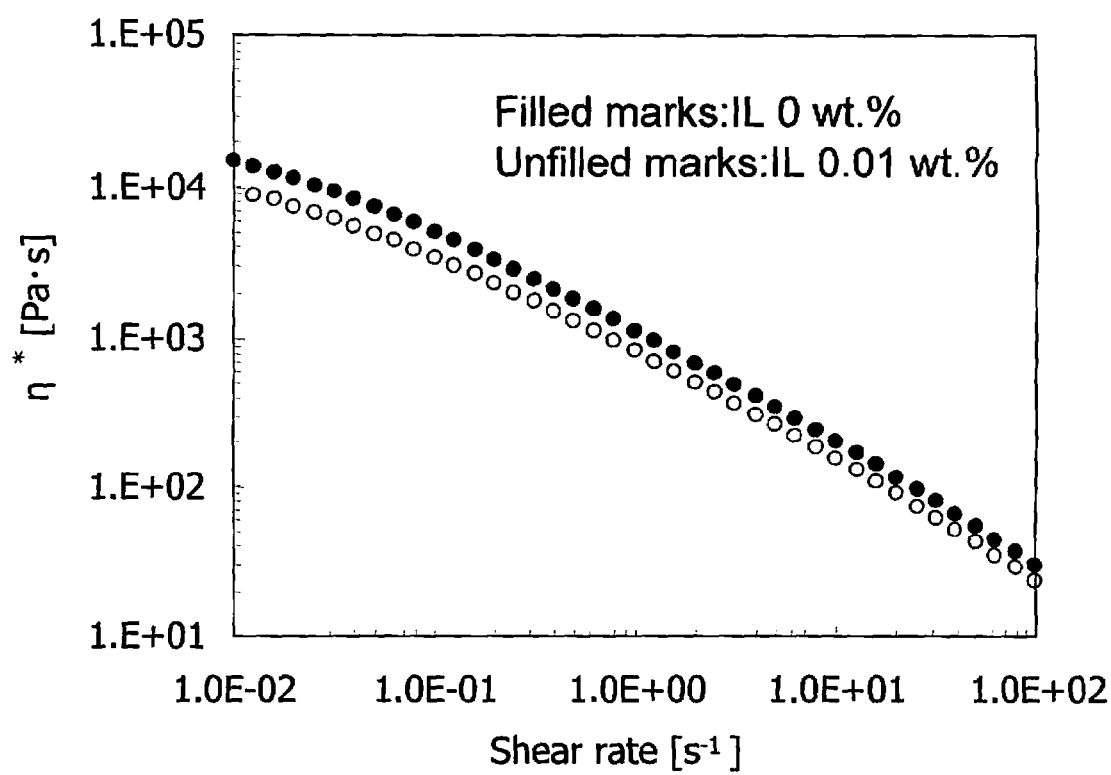
FIG. 5 is a graph of shear viscoelasticity of UHMWPE/solvent mixtures.

Solution viscosity characterization. The solution viscosity based on UHMWPE/solvent mixtures with and without the addition of ionic liquid was characterized. The sample preparation procedures were as follows. UHMWPE sample (Hizex340M, [η]: 21.5 dL/g) was used. The chosen sample was paraffin (Mn~500). The antioxidant was BHT. The weight ratio of the mixture containing ionic liquid (sample in Example 1, C22Br) was PE/IL/BHT/paraffin=5/0.01/0.05/95. The rheological testing conditions were as follows. The apparatus used was Rheometer (ARES; TA Instruments, USA). The measurement mode included both continuous shear flow and oscillatory shear flow at a temperature of about 150° C. FIG. 4 shows the profiles of linear shear viscoelasticity as measured by oscillatory shear flow of UHMWPE/solvent mixtures with and without ionic liquid are shown. FIG. 5 illustrates shear viscoelasticity as measured by continuous shear flow. FIGS. 4 and 5 illustrate that the solution comprising the ionic-liquid shows lower shear viscosity.

Example 6

Figure 6:
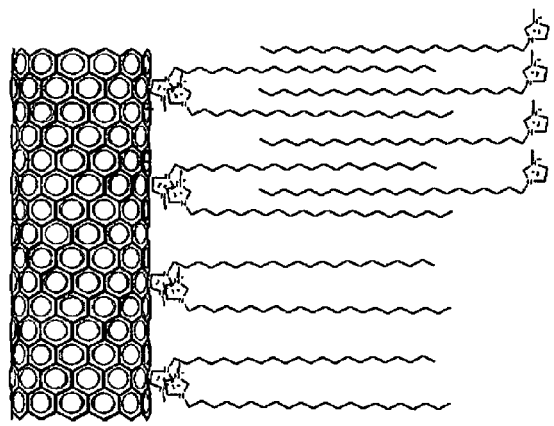
FIG. 6 is a schematic diagram of a carbon nanofiller ("CNF") modified by an ionic liquid according to the present disclosure.

Physical modification of CNF with ionic liquid to produce a nanocomposite including an ionic liquid and a CNF (modified CNF). Once the ionic liquids were prepared as in Examples 1 and 2 above, they were used to modify the CNF as shown in FIG. 6. A proportional mixture of ionic liquid and CNF was prepared in 2.0 mL of decalin following by sonicating it at about 70° C. for about 1 hour (two separate samples were prepared: the first included ionic liquid I from Example 1 above and the second sample included ionic liquid II from Example 2 above). Then, the mixture was filtered and washed three times with a large amount of decalin. The final product modified CNF for each sample was dried in vacuum for about 24 hours. A schematic representation of π-stacking arrangement of the ionic liquid I head on MWNT surface is shown in FIG. 6.

Example 7

Selective physical modification of CNF with anion-exchanged method. From about 0.2 g to about 2.0 g of ionic liquid I and 0.2 g of oxidized CNF prepared by the acid mixture of $H_2SO_4/HNO_3$=3/1 (v/v), as described in Example 5 were dispersed in water and sonicated for approximately 1 hour, separately. The suspensions were combined followed by the addition from about 0.1 mL to about 1.0 mL of HPF$_6$ aqueous solution while stirring. The mixture was separated into two layers and the iCNF was suspended as top layer. The top iCNF layer was then filtered and washed with water; the iCNF was obtained as a black solid and dried in vacuum for 1 day at room temperature.

Example 8

Chemical modification of CNF with 1-hydroxyethyl-3-docosanylimidazolium bromide (ionic liquid III) and 1-aminoethyl-3-docosanylimidazolium bromide (ionic liquid IV).

Synthesis of 1-hydroxyethyl-3-docosanylimidazolium bromide (ionic liquid III). The ionic liquid III was synthesized using the following process and was characterized by $^1$H NMR spectrum. The synthetic route is shown below:

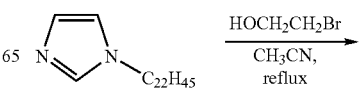

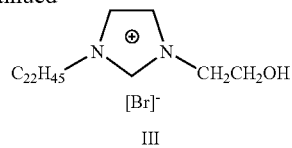

III

Approximately 3.76 g (0.010 mol) of 1-docosanylimidazole and about 1.45 g (0.012 mol) of 2-bromoethanol were dispersed into 100 mL of acetonitrile. The mixture was refluxed at 90° C. for approximately 24 hours under stirring condition, and subsequently cooled down to room temperature. The precipitate was filtered and washed with ethyl ether. The final product: 1-hydroxyethyl-3-docosanylimidazolium bromide was obtained after being dried in a vacuum oven. The yield was about 90.8% and the melting point was about 76.5° C. The spectra of $^1$H NMR (DMSO-$d_6$ as the solvent, δ, ppm) was 9.107 (N—CH—N, s, 1H), 7.743 (N—CH—CH, s, 1H), 7.712 (N—CH—CH, s, 1H), 4.192 (N—CH$_2$—CH$_2$—OH, t, 2H), 4.141 (N—CH$_2$—CH$_2$—OH, t, 2H), 3.706 (N—CH$_2$—C$_{21}$H$_{43}$, t, 2H), 1.754 (N—CH$_2$—CH$_2$—C$_{20}$H$_{41}$, m, 2H), 1.202 (N—CH$_2$—CH$_2$—(CH$_2$)$_{19}$, m, 38H), 0.822 (CH$_3$, t, 3H).

Synthesis of 1-aminoethyl-3-docosanylimidazolium bromide (ionic liquid IV). The ionic liquid IV was synthesized using the following process and was characterized by $^1$H NMR spectrum. The synthetic route was shown in below:

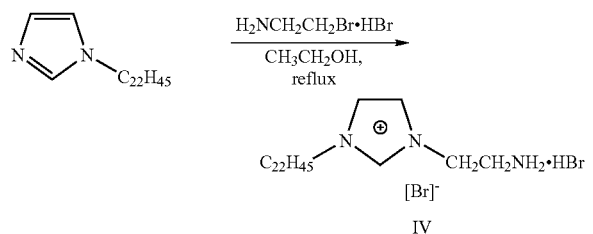

IV

About 3.76 g (0.010 mol) of 1-docosanylimidazole and about 2.46 g of 2-bromoethylamine hydrobromide were dissolved into 100 mL of ethanol, and then, the reaction mixture was reflux at 90° C. for 24 h. The product was precipitated by adding approximately 100 mL of ethyl ether and washed with ethyl ether for 3 times after filtration. The powdery product was dried in a vacuum oven, the yield was about 70.2% with a melting point of about 80.5° C. The spectra of $^1$H NMR (DMSO-$d_6$ as the solvent, δ, ppm) was 9.137 (N—CH—N, s, 1H), 7.791 (N—CH—CH, s, 1H), 7.756 (N—CH—CH, s, 1H), 4.410 (N—CH$_2$—CH$_2$—NH$_2$, t, 2H), 4.133 (N—CH$_2$—CH$_2$—NH$_2$, t, 2H), 3.638 (N—CH$_2$—C$_{21}$H$_{43}$, t, 2H), 1.769 (N—CH$_2$—CH$_2$—C$_{20}$H$_{41}$, m, 2H), 1.206 (N—CH$_2$—CH$_2$—(CH$_2$)$_{19}$, m, 38H), 0.825 (CH$_3$, t, 3H).

Chemical grafting CNF with ionic liquid III. Chemical grafting CNF or MWCNT with ionic liquid III were prepared by the process depicted in FIG. 7.

Figure 7:
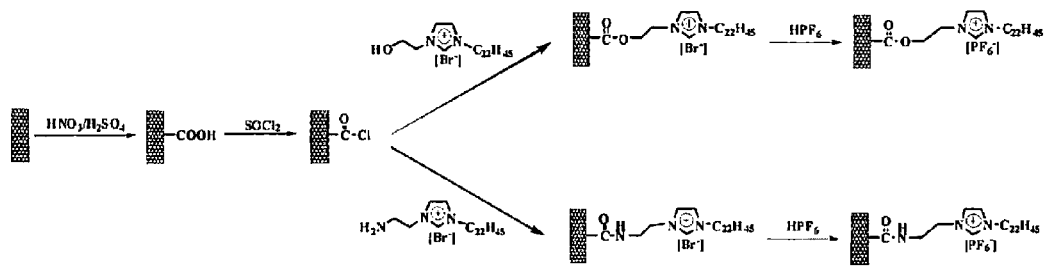
FIG. 7 is an illustration of a method of chemical grafting a CNF with an ionic liquid.

As depicted in FIG. 7, the oxidized CNF was prepared with the mixture of concentrated nitrite acid and sulfuric acid, the volumetric ratio is about $H_2SO_4/HNO_3=3:1$. About 2 g of CNF was dispersed in the acid mixture and sonicated for about 5 hours at approximately 35° C. followed by stirring at 45° C. for about 24 hours. The final product was filtrated with 0.1 μm VVLP membrane and washed with water, tetrahydrofuran (THF), and ethanol consequently. After drying in vacuum oven, the oxidized CNF was tested via TGA to estimate the content of carbonyl groups (about 13.0%), as shown in FIG. 8.

About 0.5 g of oxidized CNF was dispersed in 50 mL of anhydrous THF and was placed in an ice bath to control the reaction temperature. Excess amount of thionyl chloride (SOCl$_2$) was added slowly and the suspension was refluxed for about 5 hours under nitrogen. The acyl chloride groups were introduced onto the surface of CNF after completely removing THF and excess SOCl$_2$.

About 0.5 g of acylated CNF was dispersed with ionic liquid III and triethylamine in anhydrous THF and refluxed for about 24 hours. The ionic liquid grafted CNF was obtained after filtration and washed with water to remove any unreacted reagents. The final product was dried in a vacuum oven.

About 0.5 g of ionic liquid grafted CNF or MWCNT was dispersed in approximately 100 mL of water and about 5 g of HPF$_6$ was added to exchange anions of the ionic liquid. The reaction system was stirred for 24 hours, filtrated and washed with water 3 times. The ionic liquid grafted CNF with PF$_6$ as anion was obtained after drying the product for 24 hours.

Chemical grafting CNF with ionic liquid IV. The grafting degree of CNF with ionic liquid IV was estimated from TGA curves as shown in FIG. 8 at about 35.0%. Chemical grafting CNF with ionic liquid IV were prepared by the process depicted in FIG. 9.

As depicted in FIG. 9, the oxidized CNF with carbonyl groups was reacted with 1-(3-aminopropyl)imidazole followed by substitution with 1-bromodocosane. About 0.5 g of oxidized CNF and 5 g of 1-(3-aminopropyl)imidazole were dispersed in 50 mL of anhydrous DMSO and heated for about 24 hours under nitrogen flow. The product was separated by filtration and washed with water. After drying, further substituted reactions were performed by adding 5 g of 1-bromodocosane and 50 mL of acetonitrile, and reflux the mixture for 24 hours. After that, ionic liquid IV grafted CNF was obtained by separation of the final product by the same method.

Example 9

Preparation of nanocomposite film based modified CNF and UHMWPE. The modified CNF from Example 3 or 4 was mixed with UHMWPE in decalin. The mixture was heated to about 140° C. at about 0.2° C./minute under stirring conditions and kept at about 140° C. for about 1 hour. After cooling down to room temperature, the nanocomposite sample was separated by filtration and dried in a vacuum oven at about 60° C. to remove most of the decalin. The sample was then melt mixed with about 0.5 wt % (based on the amount of UHMWPE) of antioxidant using a twin-screw blender (DACA instruments) at about 170° C. for about 5 minutes. The recovered sample was dried in a vacuum oven at about 80° C. to constant weight (determined by TGA until loss weight was less than about 0.5% within the temperature range of 0-200° C.). All samples were melt-pressed at about 180° C. into films with a thickness of about 0.3 mm. The composition of the nanocomposites is listed in Table 4 below.

TABLE 4

| Nanocomposites | Composition (weight ratio) |
| --- | --- |
| N1 | UHMWPE:CNF:C$_{22}$Br = 100:0.2:0.2 |
| N2 | UHMWPE:CNF:C$_{22}$Br = 100:0.2:2.0 |
| N3 | UHMWPE:CNF:C$_{22}$PF$_6$ = 100:0.2:0.2 |
| N4 | UHMWPE:CNF:C$_{22}$PF$_6$ = 100:0.2:2.0 |

Example 10

Determining the stability of modified CNF in decalin. In order to determine the stability of ionic liquid anchored on the surface of CNF after the decalin washing, modified CNF was tested with TGA. The results are shown in FIG. 10. From the TGA curves, it can be seen that the modified CNF (after the decalin washing) exhibited almost the same onset temperature for decomposition as that of the pure ionic liquid. This indicates that the ionic liquid complexed on the surface of CNF is stable in decalin at room temperature and cannot be removed by normal washing procedures. In other words, the ionic liquid in modified CNF can be anchored on the CNF surface due to π-π interactions between the imidazolium cation of the ionic liquid and the para-arene surface of the CNF. The modification of modified CNF can also assist the uniform dispersion of CNF in the polymer matrix.

Example 11

Figure 11A:
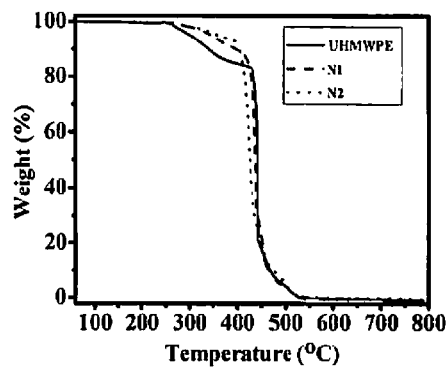
FIG. 11 is a graph illustrating thermal stability of iCNF and ultra-high molecular weight polyethylene ("UHMWPE") nanocomposite.
Figure 11B:
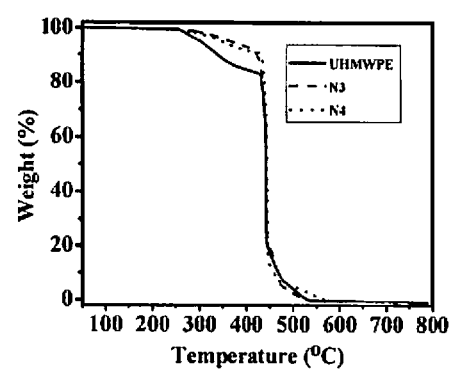

Thermal stability of modified CNF/UHMWPE nanocomposites. A series of nanocomposites were obtained after dispersion of modified CNF into UHMWPE at different weight ratios by using a solution-blending process. The addition of modified CNF was found to slightly increase the thermal stability of modified CNF/UHMWPE nanocomposites, as shown in FIG. 11.

Example 12

Figure 12A:
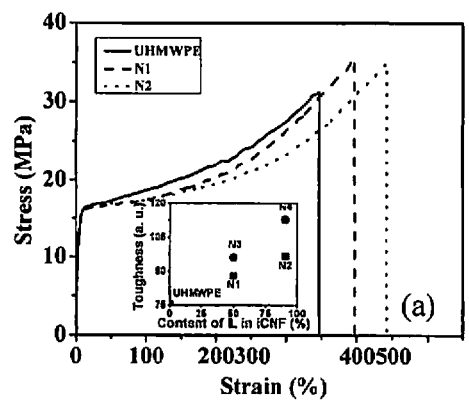
FIG. 12 is a graph of strain-stress curves of the nanocomposite according to the present disclosure.
Figure 12B:
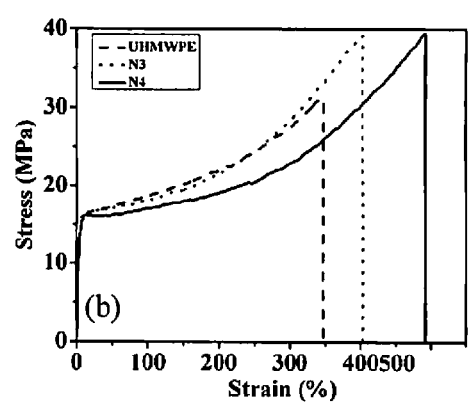

Mechanical properties of modified CNF/UHMWPE nanocomposites. The mechanical properties of modified CNF/UHMWPE nanocomposites produced in Example 6 were determined by tensile stretching measurements at room temperature. As shown in FIG. 12A, which illustrates the stress strain curve for N1 and N2, the dispersion of modified CNF in the UHMWPE matrix was found to increase the elongation-to-break ratio of the nanocomposites as well as the toughness. FIG. 12B illustrates the stress strain curve for N3 and N4. At the same time, the fraction of ionic liquid I or II in modified CNF also affected the toughness of the nanocomposites. To be specific, the toughness of UHMWPE was improved further when the fraction of ionic liquid in modified CNF was increased (the content of CNF was kept at a constant level of about 0.2%). This is because the ionic liquid on the CNF surface not only promoted the dispersion of CNF in UHMWPE, but it also provided a directed plasticization effect which improved the elongation or the toughness of the material. Furthermore, it was also found that the property (e.g. the compatibility of modified CNF and UHMWPE) of modified CNF was affected by the type of ionic liquid, i.e., cationic or anionic. For example, as hexafluorophosphate is more hydrophobic than bromide, the introduction of hexafluorophosphate in modified CNF can result in more homogeneous modified CNF/UHMWPE nanocomposite than that from 1-docosanyl-3-methylimidazolium bromide ionic liquid I. As a result, the toughness of the nanocomposites with hexafluorophosphate modified CNF was better than that of bromide, while the fraction of ionic liquid in modified CNF was the same (FIG. 12).

Example 13

Figure 13:
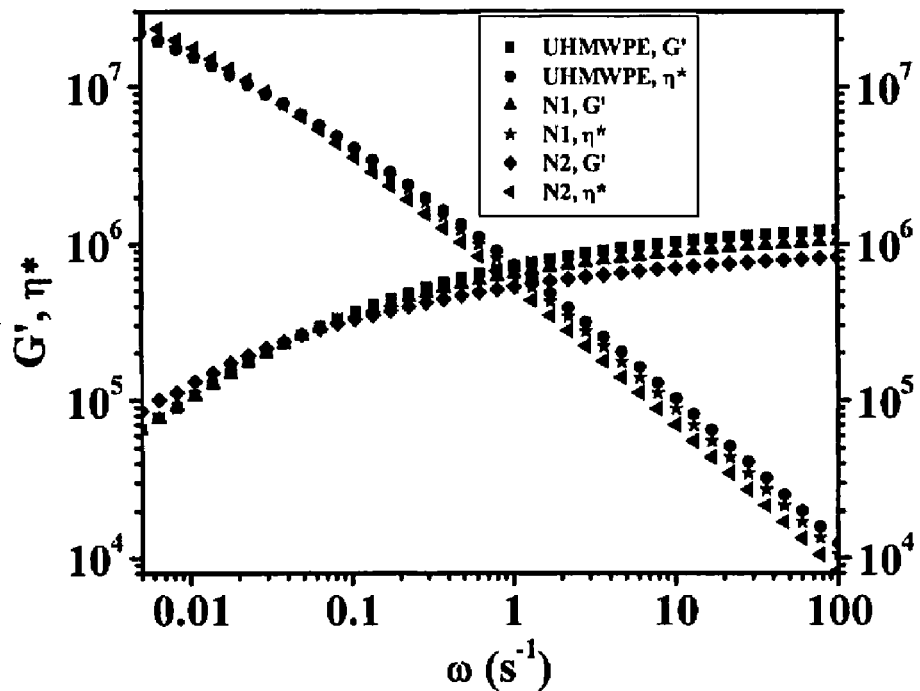
FIG. 13 is a graph of rheology behaviors of nanocomposites.

Rheological behavior of the nanocomposites. The rheological study was carried out at 180° C. and some interesting results were obtained (see FIG. 13). In the high frequency region, both the storage modulus G' and the complex viscosity η* were decreased by the presence of modified CNF (compared to pure UHMWPE). Meanwhile, the G' value of nanocomposite N2 was decreased more than that of N1 because its modified CNF contained a higher content of ionic liquid. However, a reverse trend was observed, when the frequency was lower than 0.05 s$^{-1}$. A similar result was also observed in N3 and N4 samples. The unique frequency dependence of G' and η* in modified CNF/UHMWPE nanocomposites can be explained as follows. At low frequencies, the UHMWPE chains were more relaxed. Thus the ω dependence of G' was relatively weak. As a result, the modified CNF network was significantly restrained by the large-scale polymer relaxation motions in the nanocomposite. The rheological response exhibited more solid-like viscositic behavior instead of liquid-like due to the modified CNF induced network structure. Furthermore, the N2 nanocomposite with better modified CNF dispersion (better network) was more affected than the N1 nanocomposites. In contrast, at high frequencies, the modified CNF had little effect on the short-range motion of polymer chains (especially when the length scale was comparable to the entanglement length). The presence of ionic liquid in the modified CNF made the polymer chains relax more easily due to the plasticization effect, and thus decreased the modulus G' and η*.

Example 14

Figure 14:
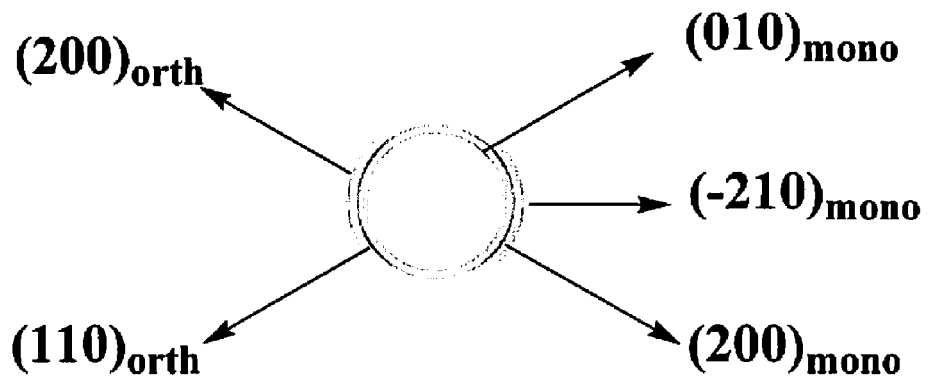
FIG. 14 is a schematic diagram of a wide-angle X-ray diffraction ("WAXD") pattern of the stretched nanocomposite.

Wide-angle x-ray diffraction (WAXD) and small-angle x-ray scatter (SAXS) characterizations. The tensile experiment was monitored by in-situ wide-angle X-ray diffraction (WAXD) and small-angle X-ray scattering (SAXS) to investigate the mechanism of toughness improvement in modified CNF/UHMWPE nanocomposites. Both orthorhombic and monoclinic structures were observed in the stretched nanocomposite. A typical 2D WAXD pattern of the stretched 0.4% modified CNF nanocomposite N2 (strain at 35%) is shown in FIG. 14, where the corresponding reflections from orthorhombic and monoclinic cells are indexed in Table 5 below, which shows the parameters of diffraction planes of the nanocomposite N2 at a strain of 35% from the 2D WAXD.

TABLE 5

| Peaks | 1 | 2 | 3 | 4 | 5 |
|---|---|---|---|---|---|
| 2θ (°) | 15.16 | 16.84 | 18.09 | 18.84 | 19.86 |
| d (Å) | 5.197 | 4.681 | 4.360 | 4.188 | 3.975 |
| (nkl)$_{mono}$ | 010 | | 200 | | −210 |
| (hkl)$_{orth}$ | | 110 | | 200 | |
| Intensity | 329.69 | 621.18 | 137.48 | 210.43 | 36.852 |

The monoclinic phase in UHMWPE was metastable but can coexist with the orthorhombic phase during stretching. The diffraction peak from CNF was missing because of its very low concentration in the nanocomposite.

Figure 15:
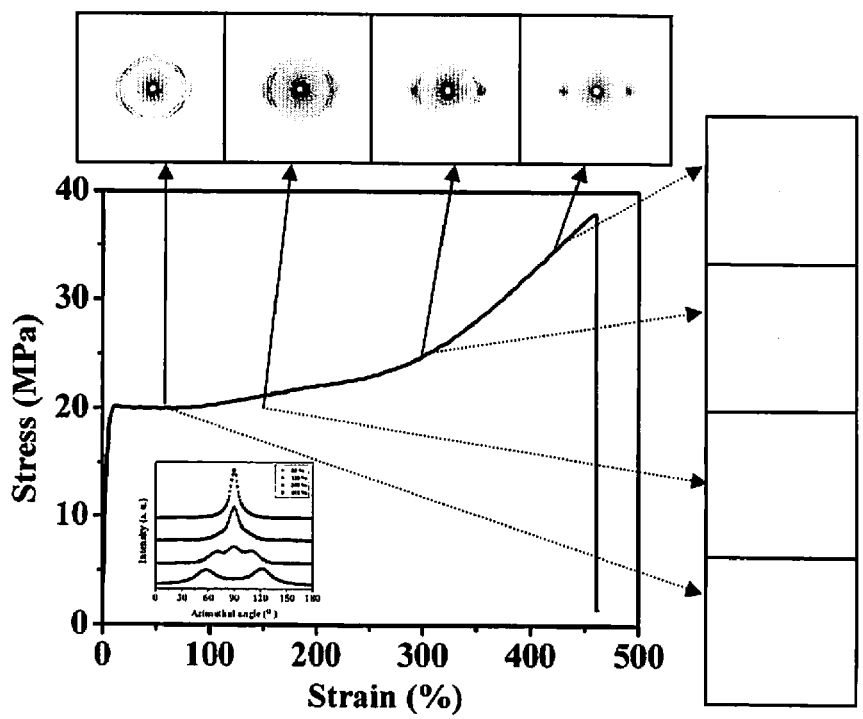
FIG. 15 is a schematic diagram of WAXD and small-angle X-ray scattering ("SAXS") patterns of stretched nanocomposite during tensile deformation.

FIG. 15 illustrates selected WAXD and SAXS patterns of the N4 nanocomposite sample during tensile deformation. The WAXD patterns as well as the corresponding azimuthal profiles of the (110) orthorhombic reflection indicated the presence of a-axis orientation, where b- and c-axis orientations were distributed in a rotationally symmetric way. After stretching, the c-axis orientation became the dominant feature. During stretching, there was a mixture of a-axis and c-axis orientations. It was seen that the crystal orientation increased by the stretching process. A four-point pattern was observed in the SAXS pattern, indicating that a titled lamellar structure formed with respect to the stretching direction. The scattering features in the SAXS patterns changed continuously from four-point to a streak-like during stretching. The equator streak patterns of all nanocomposites at high strains indicated the presence of oriented fibrillar or microvoid structures. These results confirmed the toughening behavior of the nanocomposites.

Figure 16A:
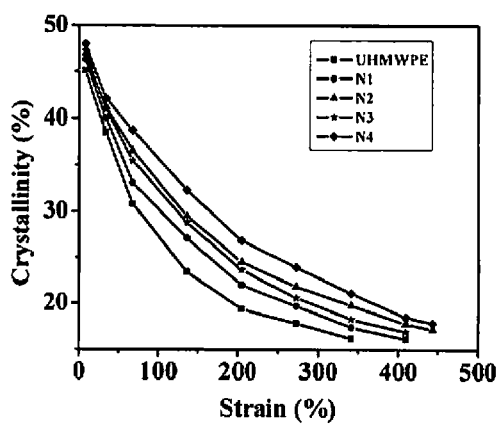
FIG. 16 includes graphs of crystallinity of the nanocomposite during stretching.
Figure 16B:
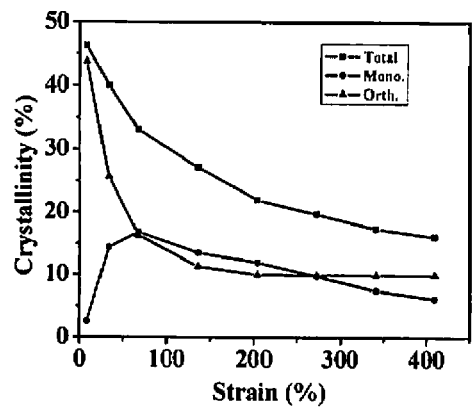

The total crystallinity of nanocomposites and the fraction of contribution of monoclinic and orthorhombic phase, which may have an impact on the mechanism by which the modified CNF toughens the UHMWPE, were also determined by the analysis of in-situ 2D WAXD data. The results are shown in FIG. 16, which shows the change of crystallinity of the nanocomposite during the stretching process on the N1 sample. The total crystallinity of UHMWPE and the nanocomposites was found to decrease during stretching. However, the crystallinity in pure UHMWPE decreased faster than that in the nanocomposites at the same elongation, in agreement with the hypothesis that ionic liquid anchored on the CNF surface acted as a "lubricant" or "plasticizer".

Thus, it can be seen that the immobilized ionic liquid can promote the sliding between the crystal region and modified CNF, which would slow down the destruction of crystal region in UHMWPE. The effect was more pronounced with the increase in the ionic liquid fraction of modified CNF. It is interesting to note that the orthorhombic phase decreased with strain, followed by an increase in the monoclinic phase. The fraction of crystal destruction in the orthorhombic phase was greater than the fraction of strain-induced crystallization of the monoclinic phase. This shows that some polyethylene chains in the orthorhombic crystal region were pulled out and a fraction of them were converted into the monoclinic phase. This may be the primary reason that the elongation-to-break ratio was improved in the nanocomposites.

Example 15

Dissolution test of molecular dye complexed with ionic liquid. Ionic liquid is also considered as a kind of surfactant. A dissolution test was performed with 3 different acids: (a) Acid Yellow 76 (a yellow dye), (b) Acid Red 1 (a red dye), and (c) Acid Blue 25 (a blue dye). Two tubes were prepared for each. One contained the dye and decalin, the other had dye, ionic liquid and decalin. The sample preparation procedures were as follows. Small amounts of dyes and ionic liquid were first mixed in the tube, and were added with decalin. After mixing, the mixtures were kept at 90° C. and photographed. Where ionic liquid was not used, dyes could not be dissolved in decalin; in the presence of the ionic liquid, dye could be easily dissolved in decalin at 90° C. The results demonstrated that ionic liquid could be used to assist the dissolution of acid dyes in decalin (normally the dye was not miscible with decalin). The result shows that ionic liquid assisted in the penetration and immobilization of molecular dye in polyolefin, thus facilitating the coloring process.

Example 16

Figure 17:
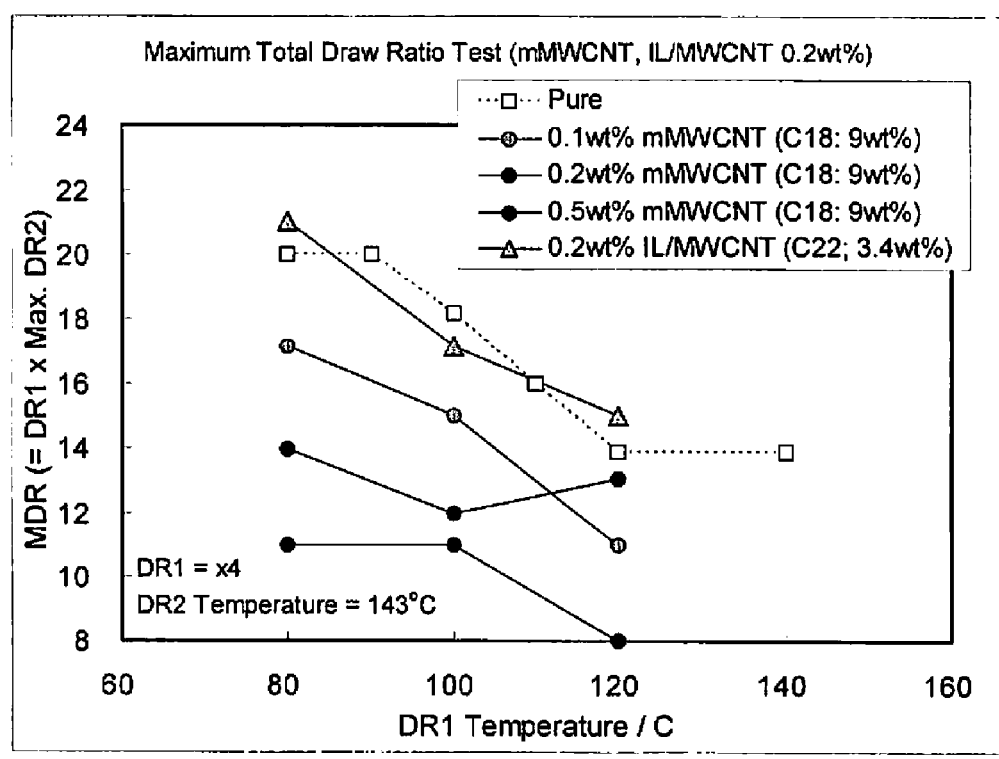
FIG. 17 is a graph of maximum draw ratios of fibers based on UHMWPE and ionic liquid modified multi-walled carbon nanotube nanocomposites.

Enhanced maximum fiber draw ratio in UHMWPE by addition of a modified MWCNT. Physical modification of multi-walled carbon nanotube (MWCNT) was also carried out by ionic liquid. The maximum draw ratios of gel-spun UHMWPE fiber (UHMWPE) and gel-spun UHMWPE nanocomposite fiber containing MWCNT with chemically grafted C18 chains and physically conjugated C22 ionic liquid (UHMWPE/modified MWCNT nanocomposites) are illustrated in FIG. 17. The draw process was carried out in two stages, where the draw ratio in stage 1 was fixed at 4×. It was seen that the maximum draw ration ("MDR") of 0.2 wt % ionic liquid modified MWCNT (iMWCNT) exhibited the highest MDR value at low temperature (80° C.). This indicated that the attainable fiber diameter of UHMWPE/iMWCNT nanocomposite may be the lowest and the corresponding denier will be higher than the existing commercial UHMWPE fiber.

As can be seen from above, a novel class of surface modified carbon nanofillers (e.g. single-walled carbon nanotubes, multi-walled carbon nanotubes, carbon nanofibers, graphene sheets, graphite nanoparticles) was prepared by conjugation with ionic liquids containing hydrophobic tails (e.g. long alkyl-substituted group). This class of carbon nanofillers could be made compatible with polyolefin (e.g. polyethylene, polypropylene, and their random and block copolymers). The charged ionic liquids can be used as a plasticizer (viscosity adjustable agents) to the polyolefin matrix, as a compatibilizer to multi-component polyolefin blends, and as functionalizable agents that can form stable complex with color dyes, molecular fingerprint agents (e.g. fluorescent agents) and antimicrobial agents. The carbon nanofillers (e.g. single-walled carbon nanotubes, multi-walled carbon nanotubes, carbon nanofibers, graphene sheets, graphite nanoparticles) can be used as nanoscale vehicles to carry functional ionic liquids through surface interactions and they also can serve as reinforcing agents. The chosen example was based on a modified CNF to improve the toughness of UHMWPE. The inclusion of 0.4 wt % of modified CNF significantly increased the elongation-to-break ratio when compared with that of pure UHMWPE. The fraction of ionic liquid in modified CNF, as well as the hydrophobicity of ionic liquid, can significantly affect the compatibility between modified CNF and UHMWPE.

While the above description contains many specific details of methods in accordance with this disclosure, these specific details should not be construed as limitations on the scope of the disclosure, but merely as exemplifications of preferred embodiments thereof. Those skilled in the art will envision many other possible variations that fall within the scope and spirit of the disclosure.

What is claimed is:

1. A polymer blend comprising:
   at least one polyolefin;
   at least one ionic liquid, and
   at least one carbon nanofiller that has been contacted with at least one ionic compound to form a modified carbon nanofiller, wherein the at least one ionic compound is selected from the group consisting of 1-docosanyl-3-methylimidazolium and 1-docosanyl-3-methylimidazolium hexafluorophosphate,
   wherein the modified carbon nanofiller is present in an amount from about 0.01 weight percent to about 30 weight percent.

2. The polymer blend as in claim 1, wherein the at least one ionic compound includes a cation selected from the group consisting of imidazolium, pyridinium and isoquinolinium, and an anion selected from the group consisting of bromide, tetrafluoroborate, hexafluorophosphate, and bis(perfluoroethylsulfonyl)imide.

3. The polymer blend as in claim 1, wherein the carbon nanofiller comprises a single-wall nanotube.

4. The polymer blend as in claim 1, wherein the carbon nanofiller comprises a multi-wall nanotube.

5. The polymer blend as in claim 1, wherein the carbon nanofiller comprises a carbon nanofiber.

6. A polymer blend as in claim 1, wherein the polyolefin is selected from the group consisting of polyethylenes, polypropylenes, ethylene-propylene copolymers, ultra-high molecular weight polyethylenes, high pressure low density polyethylenes, linear low density polyethylenes, linear medium density polyethylenes, high density polyethylenes, and modified polyethylenes.

7. A polymer blend as in claim 1, wherein the polyolefin comprises an ultra-high molecular weight polyethylene.

8. A fiber comprising the polymer blend of claim 1.

9. A film comprising the polymer blend of claim 1.

10. A method of producing a polymer blend comprising:
obtaining at least one carbon nanofiller;
treating the at least one carbon nanofiller with at least one ionic compound to produce a modified carbon nanofiller, wherein the at least one ionic compound is selected from the group consisting of 1-docosanyl-3-methylimidazolium and 1-docosanyl-3-methylimidazolium hexafluorophosphate, and
blending the modified carbon nanofiller with a polyolefin to produce the polymer blend,
wherein the modified carbon nanofiller is present in an amount from about 0.01 weight percent to about 30 weight percent.

11. A method as in claim 10, wherein obtaining at least one carbon nanofiller comprises obtaining a single-wall carbon nanotube.

12. A method as in claim 10, wherein obtaining at least one carbon nanofiller comprises obtaining a multi-wall carbon nanotube.

13. A method as in claim 10, wherein obtaining at least one carbon nanofiller comprises obtaining a carbon nanofiber.

14. A method as in claim 10, wherein treating the at least one carbon nanofiller further comprises selecting as the at least one ionic compound a cation selected from the group consisting of imidazolium, pyridinium and isoquinolinium, and an anion selected from the group consisting of bromide, tetrafluoroborate, hexafluorophosphate and bis(perfluoroethylsulfonyl)imide.

15. A method as in claim 10, wherein treating the at least one carbon nanofiller further comprises mixing the at least one carbon nanofiller with the ionic compound in decalin at a temperature of about 70° C. for a period of time of about 1 hour.

16. A method as in claim 10, wherein blending the modified carbon nanofiller with a polyolefin utilizes an ultra-high molecular weight polyethylene as the polyolefin.

17. A method as in claim 16, wherein blending the modified carbon nanofiller with a polyolefin further comprises mixing the polyolefin with decalin to form a polyolefin solution.

18. A method as in claim 17, wherein blending the modified carbon nanofiller with a polyolefin further comprises mixing the modified carbon nanofiller with the polyolefin solution at a temperature of about 140° C. for a period of time of about 1 hour.

19. A polymer blend produced in accordance with the method of claim 10.

20. A fiber comprising the polymer blend produced in accordance with the method of claim 10.

21. A film comprising the polymer blend produced in accordance with the method of claim 10.

* * * * *